S. E. BAILEY.
POTATO PEELING AND CLEANING MACHINE.
APPLICATION FILED NOV. 18, 1907.
902,466.
Patented Oct. 27, 1908.
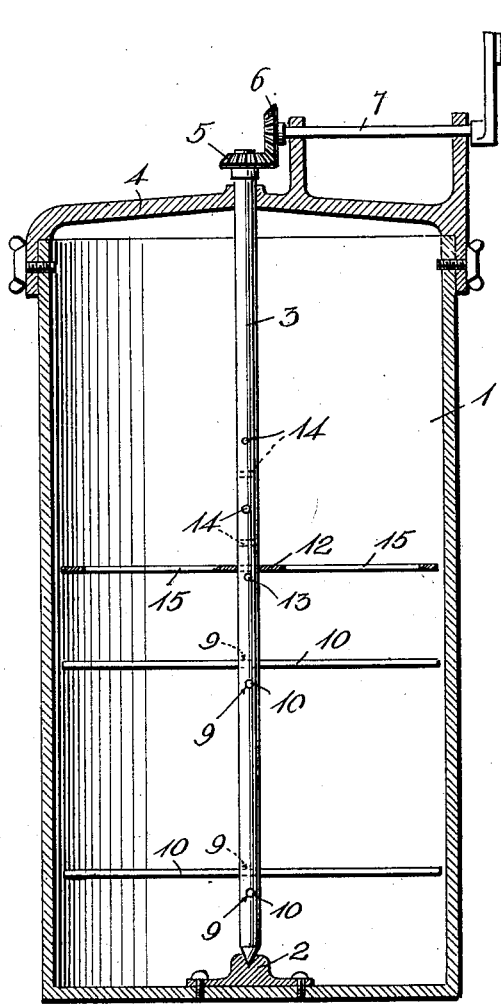
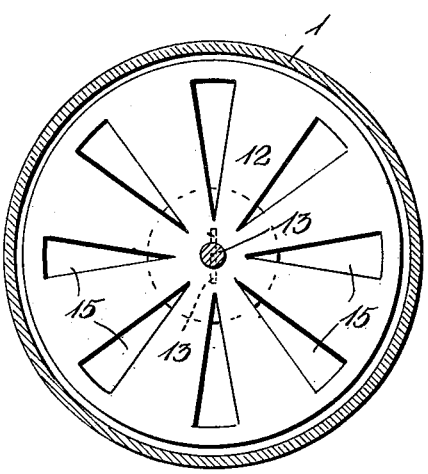
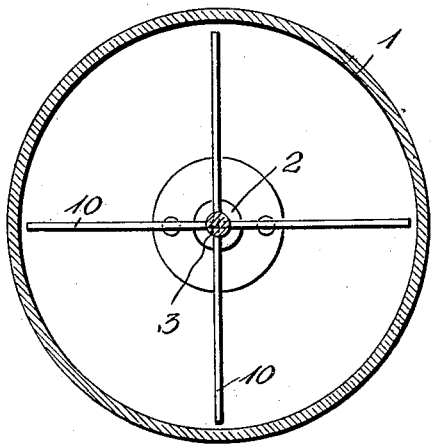
Inventor
Stephen E. Bailey
by H. B. Willson &Co.
Attorneys
Witnesses

UNITED STATES PATENT OFFICE.

STEPHEN E. BAILEY, OF COLFAX, WASHINGTON.

POTATO PEELING AND CLEANING MACHINE.

No. 902,466.  Specification of Letters Patent.  Patented Oct. 27, 1908.

Application filed November 18, 1907. Serial No. 402,735.

*To all whom it may concern:*

Be it known that I, STEPHEN E. BAILEY, a citizen of the United States, residing at Colfax, in the county of Whitman and State of Washington, have invented certain new and useful Improvements in Potato Peeling and Cleaning Machines; and I do declare the following to be a full, clear, and exact description of the invention, such as will enable others skilled in the art to which it appertains to make and use the same.

This invention relates to improvements in machines for peeling and cleaning potatoes and other vegetables.

The object of the invention is to provide a machine of this character in which a quantity of potatoes and other vegetables may be quickly peeled and washed, means being provided whereby the peelings after being removed are separated from the cleaned vegetables.

With the foregoing and other objects in view, the invention consists of certain novel features of construction, combination and arrangement of parts, as will be more fully described and particularly pointed out in the appended claims.

In the accompanying drawings: Figure 1 is a vertical sectional view of the machine. Fig. 2 is a horizontal sectional view taken above the apertured cover or partition plate: and Fig. 3 is a similar view taken below the partition plate.

In the embodiment of the invention, I provide a cylindrical receptacle which may be of any desired size and constructed of any suitable material. In the bottom of the receptacle, 1, is arranged a centrally disposed step bearing, 2, in which is revolubly mounted the lower end of an operating shaft, 3, the upper end of which is revolubly mounted in a bearing yoke, 4, the ends of which are removably secured to the upper edges of the receptacle, 1, by means of screws or other suitable fastening devices.

Fixedly mounted on the shaft, 3, adjacent to its upper end is a beveled gear pinion, 5, with which is adapted to mesh a similar pinion, 6, mounted on a drive shaft, 7, which is journaled in suitable bearings at the upper end of the receptacle and with one end of which is adapted to be engaged an operating crank handle, 8. In the lower portion of the shaft, 3, is formed a series of transversely disposed apertures, 9, which are preferably arranged in pairs, each pair of holes being spaced apart at suitable intervals. The holes or apertures of each pair are arranged at right angles to each other and through said holes are inserted agitating bars or rods, 10. Arranged at a suitable distance above the upper pair of arms or bars, 10, and adjustably mounted on the shaft, 3, is a partition or cover plate, 12, said plate being held in adjusted position on the shaft, 2, by means of a transversely disposed pin, 13, which is inserted through one of a series of apertures, 14, formed in the shaft, 3, as shown.

In the cover or partition plate, 12, is formed a series of radially disposed triangularly shaped passages, 15, the purpose of which will hereinafter appear.

In operation a suitable quantity of water is placed in the receptacle, 1, and in said water below the partition or cover plate, 12, is placed the potatoes or other vegetable to be cleaned. The plate, 12, is then adjusted on the shaft, 3, to a position in which the vegetable will be held down around the agitating rods or bars, 10. The drive shaft, 7, is now operated by the crank handle, 8, which will rapidly revolve the shaft 3, and the arms or bars, 10, which movement of the bars in and around the vegetables contained in the receptacle will rub off and remove the peelings therefrom, and thoroughly wash the same. The water in the receptacle is intended to reach some distance above the level of the plate, 12, so that the peelings and other refuse removed from the vegetables will float upwardly through the apertures in the plate, 12, and will be thus separated from the cleaned vegetables in the lower part of the receptacle.

Having thus described my invention, what I claim as new and desire to secure by Letters-Patent, is:

1. In a vegetable cleaning and peeling machine, the combination with a suitable receptacle, of an operating shaft mounted therein, a series of transversely disposed agitating rods or bars arranged through said shaft, and means adjustable on said shaft to hold the vegetables down into engagement with said rods and to permit the separation of the peelings from the vegetables after being removed therefrom.

2. In a vegetable peeling machine, the combination with a cylindrical receptacle adapted to contain water, of an operating shaft revolubly mounted in said receptacle, transversely disposed agitating rods arranged in pairs at right-angles to each other and suitably spaced apart on said shaft, an adjustable apertured plate on said shaft above said rods, means to hold said plate in its adjusted position on the shaft, and means to operate the latter, substantially as described.

In testimony whereof I have hereunto set my hand in presence of two subscribing witnesses.

STEPHEN E. BAILEY.

Witnesses:
I. B. DOOLITTLE,
M. E. SCANTLIN.